United States Patent
Reiners et al.

(10) Patent No.: US 11,260,485 B2
(45) Date of Patent: Mar. 1, 2022

(54) SEALING STRIP HOLDER

(71) Applicant: STEFAN PFAFF WERKZEUG-UND FORMENBAU GMBH & CO KG, Röthenbach im Allgäu (DE)

(72) Inventors: Alexander Reiners, Niederkrüchten (DE); Anton Sutter, Weiler-Simmerberg (DE)

(73) Assignee: Stefan Pfaff Werkzeug-Und Formenbau Gmbh & Co KG, Rothenbach im Allgau (DE)

( * ) Notice: Subject to any disclaimer, the term of this patent is extended or adjusted under 35 U.S.C. 154(b) by 237 days.

(21) Appl. No.: 15/667,993

(22) Filed: Aug. 3, 2017

(65) Prior Publication Data

US 2017/0326698 A1 Nov. 16, 2017

Related U.S. Application Data

(63) Continuation of application No. PCT/EP2016/053266, filed on Feb. 16, 2016.

(30) Foreign Application Priority Data

Feb. 16, 2015 (EP) ..................................... 15155201

(51) Int. Cl.
*B23Q 3/06* (2006.01)
*B23Q 7/00* (2006.01)
(Continued)

(52) U.S. Cl.
CPC ............. *B23Q 3/064* (2013.01); *B23Q 3/065* (2013.01); *B23Q 7/001* (2013.01);
(Continued)

(58) Field of Classification Search
CPC ........ B23P 19/047; B60J 10/45; B23Q 3/064; B23Q 3/065; B23Q 7/001; B29C 65/7844; B29C 66/5241
See application file for complete search history.

(56) References Cited

U.S. PATENT DOCUMENTS 4,620,354 A * 11/1986 Hess ..................... B23P 19/047
29/235
4,780,943 A 11/1988 St. Angelo et al.
(Continued)

FOREIGN PATENT DOCUMENTS

DE 100 21 055 A1 12/2000
DE 102 32 447 A1 2/2004
(Continued)

OTHER PUBLICATIONS

Extended European Search Report (Application No. 15155201.5) dated May 13, 2015.
(Continued)

*Primary Examiner* — Joel D Crandall
(74) *Attorney, Agent, or Firm* — Burr & Brown, PLLC (57) ABSTRACT

A sealing strip holder for manipulating and transporting a sealing strip preform in an at least partially automated production process, the sealing strip preform preferably having limp properties. To make the manufacturing process faster and less expensive the sealing strip holder comprises at least one clamping jaw which interlockingly and/or frictionally engages at least one surface portion of the sealing strip preform.

13 Claims, 5 Drawing Sheets

(51) Int. Cl.
  *B29C 65/00* (2006.01)
  *B29C 65/78* (2006.01)
  *B29L 31/26* (2006.01)
  *B29L 31/00* (2006.01)
  *B29C 65/02* (2006.01)

(52) U.S. Cl.
  CPC ...... *B29C 65/7844* (2013.01); *B29C 66/5241* (2013.01); *B29C 65/02* (2013.01); *B29C 65/7841* (2013.01); *B29C 66/02241* (2013.01); *B29L 2031/26* (2013.01); *B29L 2031/709* (2013.01)

(56) References Cited

U.S. PATENT DOCUMENTS

| | | | | |
|---|---|---|---|---|
| 5,201,106 | A | * | 4/1993 | Moore ................ B23P 19/047 29/235 |
| 6,176,699 | B1 | | 1/2001 | Franjo et al. |
| 7,644,483 | B2 | * | 1/2010 | Thomar ................ B60S 1/381 15/250.201 |
| 2008/0096003 | A1 | | 4/2008 | Dragon et al. |
| 2009/0126868 | A1 | | 5/2009 | Grohmann et al. |
| 2012/0175904 | A1 | * | 7/2012 | Murakami ............... B25J 15/10 294/213 |
| 2016/0114444 | A1 | | 4/2016 | Hofmann |

FOREIGN PATENT DOCUMENTS

| | | | | |
|---|---|---|---|---|
| DE | 102004028247 | A1 * | 12/2005 | ............ B23P 19/047 |
| DE | 10 2005 039 214 | A1 | 2/2007 | |
| DE | 10 2013 106 427 | A1 | 12/2014 | |
| JP | 08072146 | A * | 3/1996 | ......... B29C 65/7841 |
| WO | WO-2007082915 | A1 * | 7/2007 | ............ B23P 19/047 |

OTHER PUBLICATIONS

International Search Report and Written Opinion (Application No. PCT/EP2016/053266) dated May 13, 2016.

English Translation of International Preliminary Report on Patentability, International Application No. PCT/EP2016/053266, dated Aug. 31, 2017 (9 pages).

* cited by examiner

SEALING STRIP HOLDER

CROSS REFERENCE TO RELATED APPLICATIONS

This application is a continuation of International Application No. PCT/EP2016/053266 filed Feb. 16, 2016, which designated the United States, and claims the benefit under 35 USC § 119(a)-(d) of European Application No. 15155201.5 filed Feb. 16, 2015, the entireties of which are incorporated herein by reference.

FIELD OF THE INVENTION

The present invention relates to a profile holder for handling and transporting a flexible profile seal blank, a transport device for transporting a profile seal blank, and a method for manufacturing a profile seal from a flexible profile seal blank.

BACKGROUND OF THE INVENTION

Seals, in particular flexible profile seals, for avoiding undesirable transfers of substances between two spaces, are known in a multiplicity of different embodiments. Flexible seals generally have a low modulus of elasticity and low rigidity under extension, and therefore large deformations are possible even as a result of being subjected to a small force and torque stress.

Profile seals of this type are used, for example, in vehicle manufacturing, in particular, in the region of vehicle doors, wherein the profile seals are intended to have a high degree of flexibility and dimensional stability.

Due to the multiplicity of different embodiments of a vehicle door, profile seals of this type have to be adapted by corresponding processing operations, for which sometimes special processing and conveying techniques are required.

For the processing and conveying of profile seals of this type, the latter are customarily provided with what is referred to as an integrated carrier which has to be brought in a complicated manner into the profile seal to be processed in each case in order to fasten the profile or the profile seal to the vehicle.

SUMMARY OF THE INVENTION

It is the object of the present invention to improve the production of a profile seal with flexible properties in respect of the manufacturing time and the production costs.

The present invention comprises a profile holder for handling and for transporting a profile seal blank in an at least partially automated manufacturing process, wherein the profile seal blank preferably has flexible properties.

The essence of the invention consists in that the profile holder comprises at least one clamping jaw which lies in a form-fitting/or force-fitting manner against at least a partial surface of the profile seal blank. In an advantageous development of the invention, at least two clamping jaws are provided in order to grasp a part of the profile seal blank, wherein in particular the clamping jaws are arranged in such a manner that they lie on opposite sides against that part of the profile seal blank which is to be grasped. This can make it possible for force to be transmitted particularly effectively to the profile during transport.

The profile holder according to the present invention makes it possible for profile seals having different profile shapes which have flexible properties to be held in the profile holder during processing of the profile seal in order, at the profile seal, to be able to undertake processing, which is more precise than in the prior art, by means of corresponding processing steps so that the profile seal does not have to be removed and reinserted between individual manufacturing steps. The profile holder improves the dimensionally stable properties of the profile seal blank during the processing, these properties being comparable to a profile seal blank with an integrated carrier. A carrier can greatly simplify the handling in an advantageous manner in the present invention, in particular in the event of automation.

The flexibility of the blank can also be maintained here.

Furthermore, the transport by the profile holder according to the present invention between individual processing stations is improved in such a manner that the time-consuming and costly removal of the blank manually from a processing station and transport and insertion in a subsequent processing station can be omitted.

In particular, the handling of the profile seal blank during the transport/during the processing can be decisively improved.

Furthermore, processing operations at different positions of the profile seal blank are made possible by the clamping jaws of the profile holder lying in a form-fitting and/or force-fitting manner against at least a partial surface of the profile seal blank. The clamping jaw or clamping jaws can be, for example, of bar-shaped design (as clamping bars) in order to be able to lie along the profile of the seal blank, thus permitting form-fitting lying thereagainst without, for example, impressing the seal blank. The holding of the profile can therefore be achieved by the fact that the profile holder or the clamping jaw results in a geometrical constraint. Furthermore, frictional forces can also assist the holding. In the case of force-fitting holding, a force can also be exerted directly on the profile.

In an expedient development of the profile holder according to the invention, the latter has processing recesses for processing the profile seal blank. The processing recesses permit processing of the profile seal blank arranged in the profile holder, as a result of which time-consuming rechucking of the profile seal blank in the profile holder can be avoided. The processing recesses can be arranged virtually at any point to be processed.

Furthermore, it is provided, in a further refinement of the invention, that the profile holder is designed in such a manner that, for processing, the profile seal blank projects over the profile holder on the longitudinal and/or end edges thereof. By means of this embodiment of the profile holder, in addition to a processing operation at the processing recesses of the profile holder, it is likewise possible for a processing operation to take place in the end regions of the profile seal blank arranged in the profile holder, for example trimming of the profile seal blank or heating of the end regions for a subsequent thermal joining operation to produce an endless seal.

In a further preferred refinement of the present invention, the profile holder comprises a basic frame for the mounting of the clamping jaw(s). The basic frame in turn can be used to permit good handling during the transport, in particular during the automated transport during the processing or manufacturing of the seal. In addition, the clamping jaws which are fastened to the basic frame can generally be replaced in a simple manner, for example, during maintenance or if a different profile is intended to be processed.

The clamping jaws can be moved linearly, for example, via hydraulic and/or pneumatic cylinders, in order to carry out a clamping operation at the profile seal blank, for example, at a sealing lip of the profile seal blank. Furthermore, the clamping jaws can be guided in the basic frame by arrangement of guide profiles, for example, a dovetail, in correspondingly arranged guide grooves, when the clamping jaws carry out a linear movement. On account of the mounting of the clamping jaws within the basic frame, it is possible for the clamping jaws to be able to be carried along during the entire processing of the profile seal blank.

In a further aspect of the present invention, a transport device is provided for transporting a profile seal blank in an at least partially automated manufacturing process, wherein the transport device comprises a receiving device for receiving a profile holder. The transport device for such a processing process of a profile seal blank permits, for example, linear transport of the profile seal blank, but also non-linear movement paths are conceivable. A robot can be used for the transport. In addition, it is conceivable that the profile seal blank has to be rotated during the processing or positioned in another way for the processing. For processing the profile seal blank, the latter is arranged together with the corresponding profile holder on the transport device by means of a corresponding receiving device. For example, electrically, hydraulically, pneumatically and/or mechanically actuable devices can be used as the receiving device for realizing an arrangement of the profile holder.

Furthermore, it is provided, in a further preferred refinement of the invention, that the profile holder is integrated in the transport device. A profile holder which is integrated in the transport device is used, for example, in the processing of profile seal blanks in large batches. As a result, an additional receiving device for the alternative receiving of different profile holders can be dispensed with since the required elements of the profile holder, such as, for example, the basic frame, and also the linearly moveable clamping jaws are integrated in the transport device.

In principle, it is also conceivable for the entire profile holder to be transferred onto a corresponding transport system (for example a robot). This has the advantage that a plurality of profile holders can be transported in the transport system at the same time, which can lead to a reduction in transport times in the transport system of the profile seals to be processed. In addition, various profile holders can be used in the transport system.

In a furthermore preferred refinement of the present invention, it is provided that the transport device has a mechanism for moving and/or for positioning the profile holder and/or for processing the profile seal blank. In general, any mechanism which is suitable for carrying out a linear, rotational, lifting and/or tilting movement (in particular corresponding robots) can be used as the movement mechanism. Owing to the movement mechanism which are arranged, the profile seal blank arranged in the profile holder can be moved into an exact processing position for a processing operation at a point of the profile seal blank to which access is difficult.

Furthermore, in a further refinement of the present invention, it is provided that a loading station is provided which is designed to introduce the flexible profile seal blank into the profile holder.

The profile seal blank is mounted, for example, in a magazine and transferred in an automated manner to the profile holder. The automated transfer of the profile seal blank is then carried out by means of a loading station which acts, for example, at a free end of the profile seal blank and pulls the latter into the profile holder by means of a linear movement. A gripper for handling the profile seal blank can be integrated in the loading station. The loading station can also temporarily store one or more profile seal blanks, as a result of which the processing can be accelerated and configured more flexibly.

In principle, various variants are conceivable, such as a relative movement can be realized between the profile seal blank and the profile holder. The loading station holds the profile seal blank. The profile seal blank can be introduced into the profile holder either in such a manner that the loading station moves with the profile seal blank while the profile holder is stationary, or, conversely, that the profile holder is moved while the loading station with the profile seal blank is stationary. Both the profile seal blank can therefore be pushed in the profile holder and also conversely the profile holder is pushed onto the profile seal blank. A robot can carry out the transport of the profile to the individual work stations. In addition, it is also conceivable for only the profile seal blank to be moved while the loading station into the profile holder are stationary.

For the handling of the profile seal blank, the gripping mechanism for handling the profile seal blank can directly comprise a profile holder. By means of this measure that the profile holder at the same time takes on the gripping operation of the profile seal blank, a simplification of the manufacturing can take place because no additional grippers have to be provided, and the means for gripping the profile seal blank do not have to be exchanged because the profile holder to be used always takes on this task.

Furthermore, the present invention makes provision, in a further preferred embodiment, for the loading station to have a counter holder for holding a profile seal blank.

During the transfer of the profile seal blank from the magazine to the profile holder, the profile seal blank is held by means of a counter holder arranged in the loading station and is secured against unintentional dropping out.

In a refinement of the invention, it is provided that the transport device is designed to carry along the counter holder with the profile seal blank. The counter holder arranged for holding a profile seal blank is then likewise passed along during the transfer of the profile seal blank onto the profile holder, as a result of which a positionally precise and dimensionally stable guidance of the profile seal blank during the transfer onto the profile holder can be permitted. However, transport devices in which the counter holder remains in the loading station are also conceivable. When the blank is transported, the counter holder can also be temporarily moved away from the blank and can then enter into contact again with the blank when the transport operation is ended and the blank is intended to be held.

In a further aspect of the present invention, a method is provided for manufacturing a profile seal from a profile seal blank which preferably has flexible properties, wherein the profile seal blank is received and held in a profile holder. Owing to the method according to the present invention, an automated processing of a flexible profile seal blank can be carried out. The advantage of the method according to the present invention is the possible time-saving and cost-effective processing of a flexible profile seal blank in an at least partially automated processing process since manual transport and orientation of the profile seal blanks, which would otherwise be necessary at least in subsections, are omitted.

Furthermore, an embodiment of the method according to the present invention provides transport of the profile holder to and/or in the manufacturing process, the positioning of the profile holder and the processing of the profile seal blank.

The method according to the present invention permits time-saving processing of a profile seal blank in an at least partially automated processing process.

Further features of the present invention emerge from the following description of the figures of the exemplary embodiment and the drawings. The profile seal blank cannot only be held but also roiled up, in a variant embodiment of the present invention. This can basically be brought about via a counter holder or a clamping bar or a clamping jaw. However, at least one contact pressure roller for rolling up a part of the profile can also be provided as part of the loading station or as the transport device. For this purpose, pressure can be exerted with the contact pressure roller against a part, for example, against a lip of the blank. Instead of a contact pressure roller which can roll in contact with the profile blank, a pin or a jaw may also be used.

DETAILED DESCRIPTION OF THE INVENTION

Figure 1:
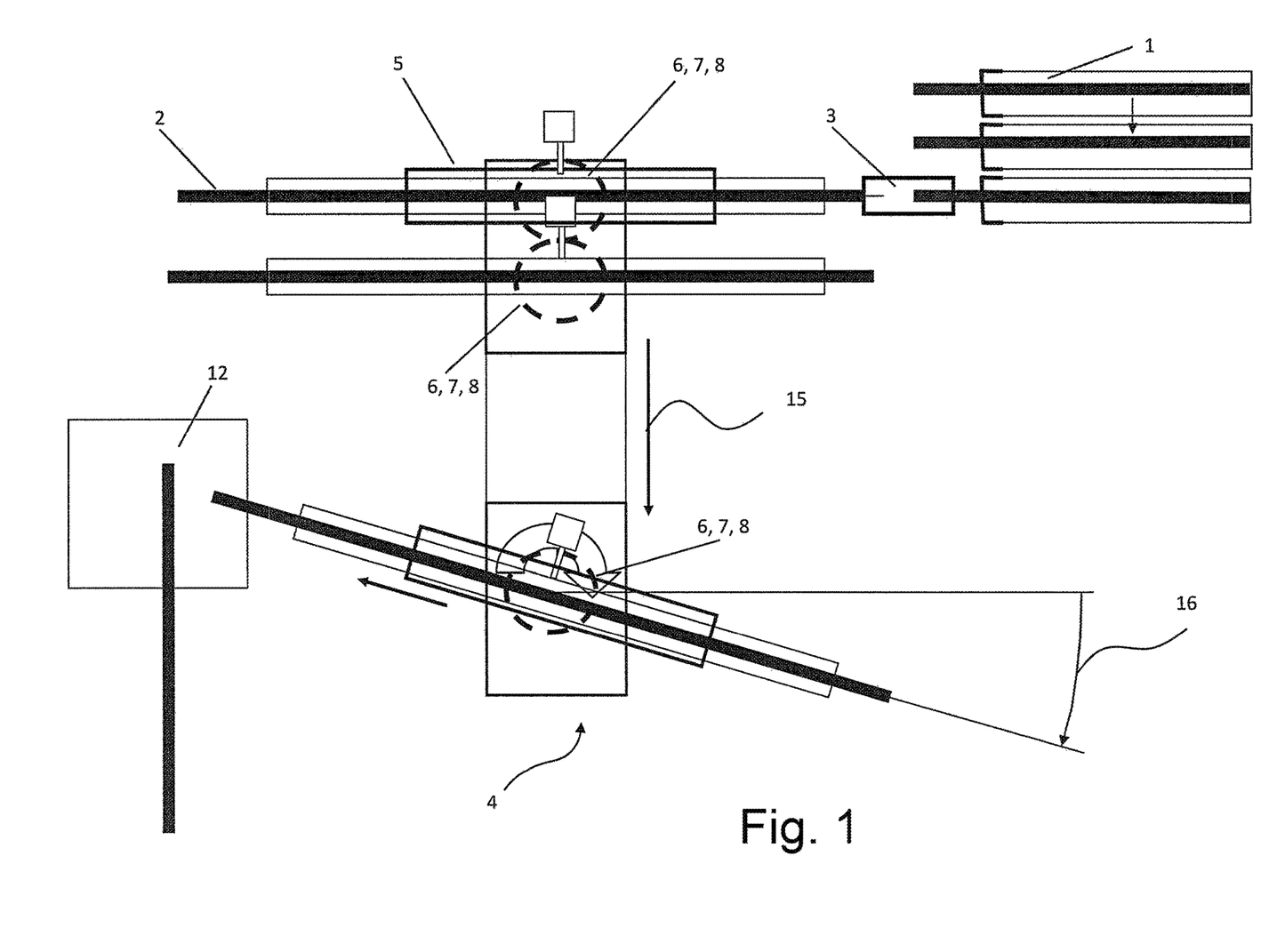
FIG. 1 shows a schematic illustration of a processing process for a profile seal blank.

FIG. 1 shows the abutment elements required for processing a flexible profile seal blank 2 in a schematic illustration, wherein the profile seal blank 2 is transferred from a magazine 1 for storing profile seal blanks 2 by means of a loading station 3 onto a transport device 4 for further processing.

The profile seal blanks 2 which are mounted next to one another in the magazine 1 are introduced at a dispensing position of the magazine 1 by the loading station 3 into a profile holder 5 arranged on the transport device 4.

The removal of a profile seal blank 2 from the magazine 1 and subsequent transfer onto the profile holder 5 arranged in the transport device 4 can be carried out, for example, by corresponding gripping elements arranged in the loading station 3. For this purpose, a correspondingly designed gripper of the loading station 3 acts at a free end of the profile seal blank 2, wherein the profile seal blank 2 is introduced by a linear movement of the loading station 3 in the axial direction of the profile seal blank 2 into a profile holder 5 arranged in the transport device 4. Instead of a linear movement, the profile seal blank can basically be moved on any conceivable curved shape, for example by a robot.

For improved transfer of the profile seal blank 2 onto the transport device 4, the latter has a mechanism 6, 7, 8 for the movement and positioning, the mechanism bringing the profile holder 5 into position by means of a rotational or pivoting, linear, lifting and/or tilting movement in such a manner that a profile seal blank 2 can be transferred out of the magazine 1 into the profile holder 5 without disruption.

After a profile seal blank 2 is introduced into the profile holder 5, the latter is transported by the transport device 4 by means of a linear movement 15 to a first or a further processing station.

In the exemplary embodiment illustrated, here, the profile holder 5 has a clamping jaw 10 and a clamping bar 11, the cross-sectional profile of which is adapted to the cross section of the profile seal blank 2. As a result, a form-fitting and optionally also force-fitting holding of the profile seal blanks 2 in the profile holder 5 can be carried out. In the present case, the clamping jaw or the clamping bar 11 fills the space between two sealing lips in a form-fitting manner.

In addition, a counter holder 9 arranged in the loading station 3 can be transferred onto the profile holder 5 and carried along by the latter during the entire processing process of the profile seal blank 2. The clamping jaw 10 and clamping bar 11 arranged in the profile holder 5 have corresponding processing recesses in the regions to be processed of the profile seal blank 2, the processing recesses being matched to the respective processing positions of the profile seal blank 2. On account of the processing recesses, a renewed arrangement of a profile seal blank 2 in the profile holder 5 for processing steps with changing positions is not required.

Furthermore, the length size of the profile holder 5 is adapted to the length size of the profile seal blank 2 in such a manner that the end regions of the profile seal blank 2 project over the profile holder 5 for processing in the end regions of the profile seal blank 2.

On account of the mechanism 6, 7, 8 for moving, positioning and processing the profile seal blank 2, the mechanism being arranged in the transport device 4, the position, for example, of the profile seal blank 2 can be moved by a corresponding movement of the profile holder 5 into the respective processing position in a processing station in order to be able to carry out processing of the profile seal blank 2.

In the illustration shown in FIG. 1, after the processing is ended, the processed profile seal blank 2 is transferred onto a magazine 12 for finished parts, wherein the transfer of the of the profile seal blank 2 to the magazine 12 can be carried out manually or in an automated manner by means of a further loading station (not illustrated here).

Figure 2:
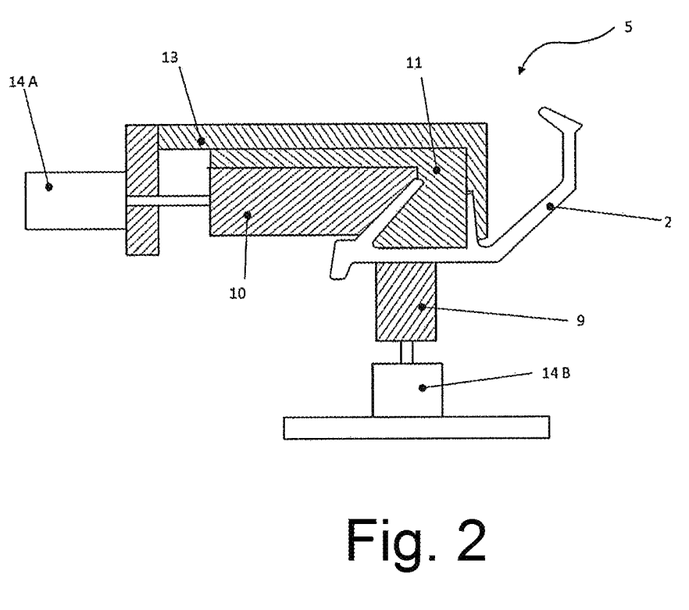
FIG. 2 shows a schematic illustration of the holding and device elements at the time of the transfer of the profile seal blank onto the profile holder.

FIG. 2 illustrates a schematic illustration of a profile holder 5 in cross section, wherein the profile holder 5 comprises a basic frame 13 which is designed for receiving and fastening a clamping bar or a clamping jaw 10.

A clamping jaw 10 and a clamping bar 11 which fix the profile seal blank 2 in the profile holder 5 are fastened to the basic frame 13. In principle, clamping jaws and/or clamping bars can also be integrated in the basic frame.

In the embodiment of the profile holder 5 that is illustrated in FIG. 2, the clamping jaw 10 and the clamping bar 11 are moved linearly within the basic frame 13 of the profile holder 5 by a corresponding drive means 14 A and therefore carry out a clamping operation of the profile seal blank 2 in the profile holder 5. In addition, the basic frame 13 which is illustrated here has, on its inwardly directed inner surface opposite the profile seal blank 2, a surface profile which is adapted to the profile of the profile seal blank 2 and can be used as what is referred to as a stationary clamping jaw. A plurality of drive means can be provided.

For an improved clamping behavior of the profile seal blank 2 in the profile holder 5, the profile seal blank has a counter holder 9 which improves a form-fitting and force-fitting clamping. The counter holder 9 can carry out a manual clamping movement or, by means of an arranged drive means 14B an automated clamping movement.

The counter holder 9 can be designed as a device element of the profile holder 5 or as a device element of the loading station 3. As part of the profile holder, the counter holder 9 can be is transferred from the loading station 3 onto the profile holder 5 for improved transfer of the profile seal blank 2 from the magazine 1 to the profile holder 5 and can be carried along by the profile seal blank during the entire processing cycle of the latter.

In principle, it is conceivable for the clamping jaw to be of form-fitting design and to act on the profile seal blank in such a manner that, because of this geometrical constraint and/or the frictional forces which would act during slipping out of the blank, the profile seal blank cannot slip out. It is also conceivable for the blank to be held, optionally additionally, by an active action of force.

Figure 3:
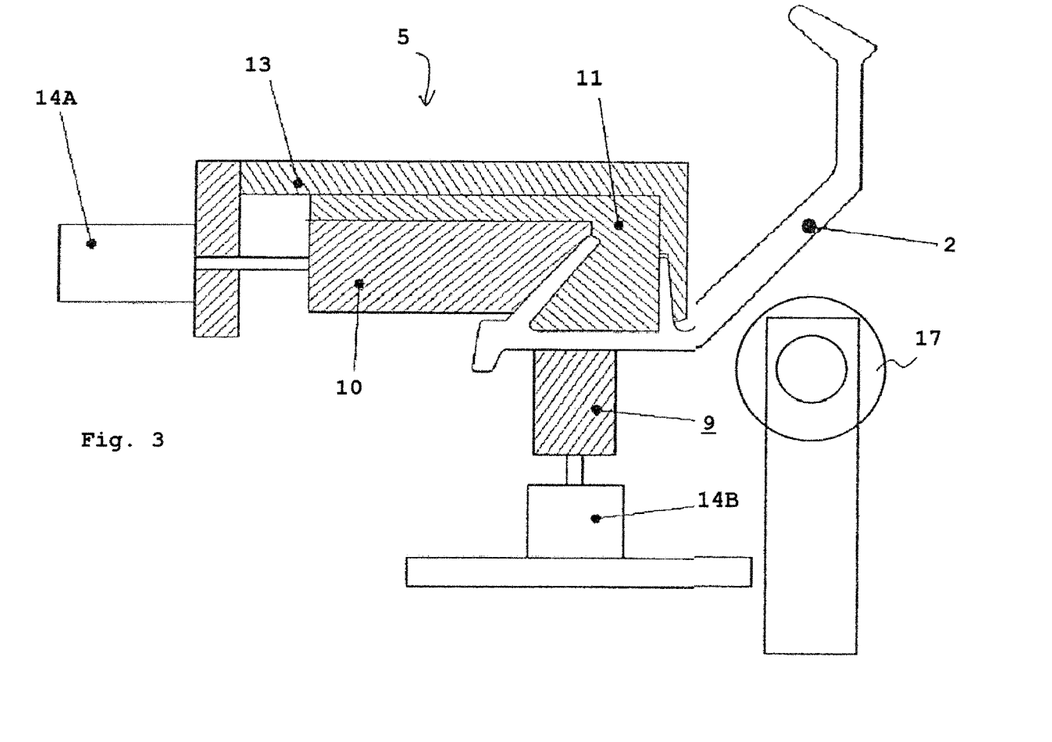
FIGS. 3 to 5 show a schematic illustration of a contact pressure operation during the holding and handling of the profile seal blank on the profile holder.
Figure 4:
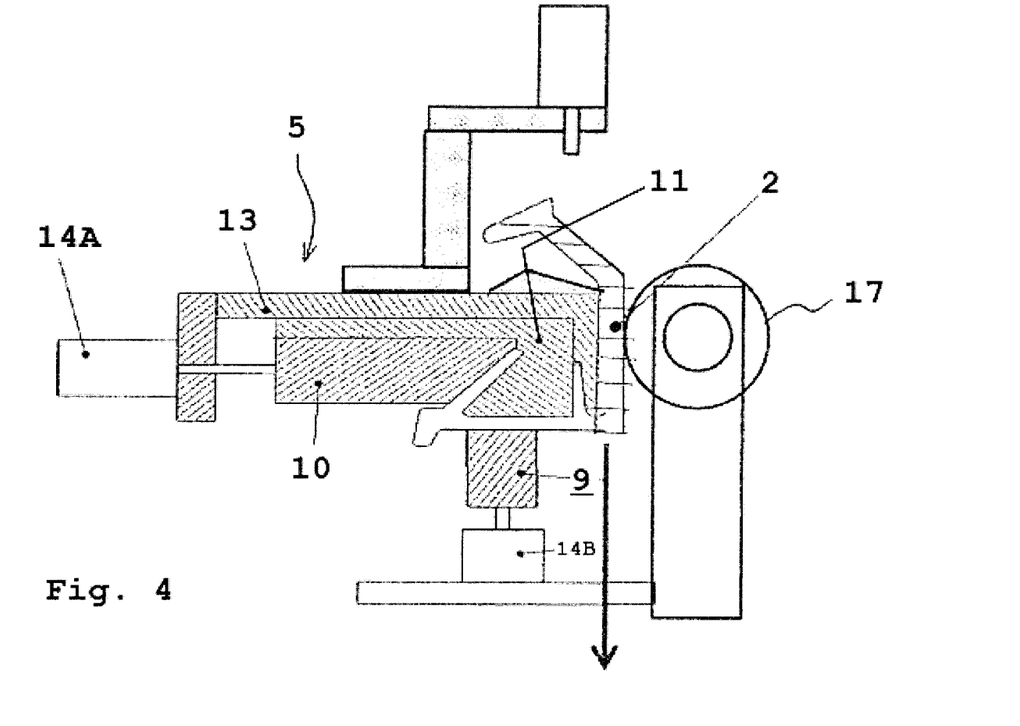
Figure 5:
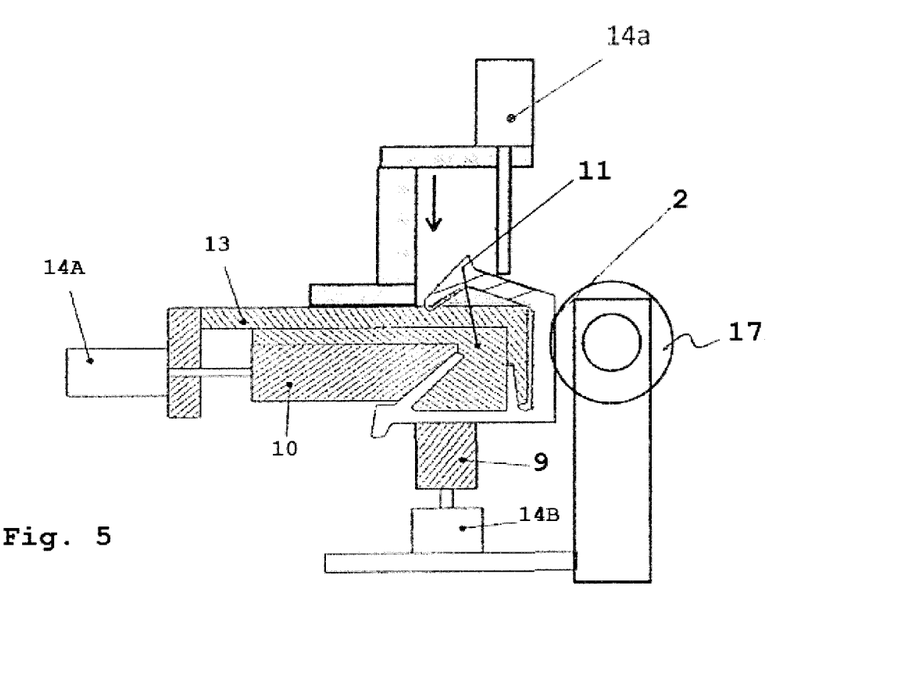

FIGS. 3 to 5 show that an extension of the function of gripping at the profile holder can additionally be undertaken by robot technology since the movements for the contact pressure or rolling up of the profile seal blank against or onto the holder can be undertaken by a robot. The actual clamping function is then integrated in the profile holder. An advantage of this embodiment is that the profile or the profile seal blank, before the latter is introduced into the respective station for processing, can be brought and thus held in the respectively optimum position for this processing step.

With regard to the sequence, after the profile seal blank 2 is clamped via the clamping jaw 10, as is illustrated, for example, in FIG. 2, the profile is, if required, processed in this position. Subsequently, a free limb of the profile seal blank 2 is pressed against with the aid of the contact pressure roller 17. For this purpose, the entire device which obtains/holds the profile seal blank 2 is moved against the contact pressure roller 17. The situation in which the limb is pressed against the profile holder 5 or against the basic frame 13 is illustrated in FIG. 4. The entire profile holder 5 can then be moved together with the profile seal blank 2 and the contact pressure roller 17.

The still remaining partial limb of the profile seal blank is pressed against the basic frame 13 or against the profile holder 5 via a slide of the additional drive means 14A. These steps may be necessary in order to be able to ensure the further processing. The entire profile holder 5 including the contact pressure roller 17 and drive means 14A can in turn be moved.

LIST OF REFERENCE NUMBERS

1 Magazine (blank)
2 Profile seal blank
3 Loading station
4 Transport device
5 Profile holder
6 Mechanism for moving, positioning, processing
7 Mechanism for moving, positioning, processing
8 Mechanism for moving, positioning, processing
9 Counter holder
10 Clamping jaw
11 Clamping bar
12 Magazine (finished part)
13 Basic frame
14A Drive means of clamping jaw
14B Drive means of counter holder
15 Linear movement
16 Pivoting movement
17 Contact pressure roller

The invention claimed is:

1. A profile holder for handling and transporting a flexible profile seal blank in an at least partially automated manufacturing process, the profile holder comprising:
two clamping members having opposed planar clamping surfaces, wherein a cross-sectional shape of the two clamping members includes processing recesses in which the flexible profile seal blank fits, and wherein the opposed planar clamping surfaces engage against opposing sides of at least one partial surface of the flexible profile seal blank in at least one of a form-fitting and a force-fitting manner,
wherein the profile holder comprises a frame mounting the two clamping members,
wherein the profile holder has opposed longitudinal side edges defining a longitudinal extension direction of the profile holder, wherein the profile holder has opposed end edges arranged substantially perpendicular with respect to the longitudinal extension direction, and wherein the flexible profile seal blank projects over the profile holder on one of the longitudinal side edges and one of the end edges thereof, and
wherein at least one of the processing recesses is defined between an outer surface of one of the clamping members and an inner surface of the frame immediately proximate one of the longitudinal side edges of the profile holder.

2. A transport device for transporting a flexible profile seal blank in an at least a partially automated manufacturing process, the transport device comprising:
the profile holder according to claim 1; and
a receiving device for receiving the profile holder.

3. The transport device as claimed in claim 2, wherein the transport device further comprises a mechanism that moves and/or positions the profile holder and/or processes the flexible profile seal blank.

4. The transport device as claimed in claim 2, further comprising a loading station that introduces the flexible profile seal blank into the profile holder, wherein the loading station grips the flexible profile seal blank in a holding manner to either push the flexible profile seal blank into the profile holder or to hold the flexible profile seal blank in a stable position while the profile holder is pushed onto the flexible profile seal blank.

5. The transport device as claimed in claim 4, wherein the loading station further comprising a counter holder having a planar clamping surface that engages one side of another partial surface of the flexible profile seal blank.

6. The transport device as claimed in claim 2, further comprising a counter holder having a planar clamping surface that engages one side of another partial surface of the flexible profile seal blank.

7. The transport device as claimed in claim 6, wherein the transport device is adapted to carry the counter holder along with the flexible profile seal blank.

8. A transport device for transporting a flexible profile seal blank in an at least a partially automated manufacturing process, the transport device comprising:
the profile holder according to claim 1,
wherein the profile holder is integrated with the transport device.

9. The profile holder according to claim 1, wherein the opposed planar clamping surfaces of the two clamping members linearly engage the at least one partial surface of the flexible profile seal blank in a direction that is substantially perpendicular to the longitudinal extension direction of the flexible profile seal blank.

10. A method for manufacturing a profile seal from a flexible profile seal blank, the method comprising the steps of:
providing the flexible profile seal blank;
providing a profile holder for handling and transporting the flexible profile seal blank, the profile holder comprising two clamping members having opposed planar clamping surfaces, wherein a cross-sectional shape of the two clamping members includes processing recesses in which the flexible profile seal blank fits, and wherein the opposed planar clamping surfaces engage against opposing sides of at least one partial surface of the flexible profile seal blank in at least one of a form-fitting and a force-fitting manner, wherein the profile holder comprises a frame mounting the two clamping members, wherein the profile holder has opposed longitudinal side edges defining a longitudinal extension direction of the profile holder, wherein the profile holder has opposed end edges arranged substantially perpendicular with respect to the longitudinal extension direction, and wherein the flexible profile seal blank projects over the profile holder on one of the longitudinal side edges and one of the end edges thereof, and wherein at least one of the processing recesses is defined between an outer surface of one of the clamping members and an inner surface of the frame immediately proximate one of the longitudinal side edges of the profile holder; and receiving and holding the flexible profile seal blank in the profile holder by pushing the flexible profile seal blank into the profile holder or by pushing the profile holder onto the flexible profile seal blank.

11. The method as claimed in claim 10, further comprising a step of arranging the profile holder with the flexible profile seal blank received therein in a receiving device of a transport device.

12. The method as claimed in claim 11, wherein a counter holder is carried along with the flexible profile seal blank in the transport device.

13. The method as claimed in claim 10, further comprising at least one of:
- a step of transporting the profile holder to and/or in the manufacturing process;
- a step of positioning the profile holder; and
- a step of processing the flexible profile seal blank.

* * * * *